United States Patent
Cheng et al.

(10) Patent No.: US 12,502,017 B1
(45) Date of Patent: Dec. 23, 2025

(54) TRAY MODULE

(71) Applicant: PRIMAX ELECTRONICS LTD., Taipei (TW)

(72) Inventors: Jui-Jen Cheng, Taipei (TW); Chang-Ming Huang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 18/931,133

(22) Filed: Oct. 30, 2024

(30) Foreign Application Priority Data

Sep. 30, 2024 (TW) .................. 113137336

(51) Int. Cl.
| | |
|---|---|
| *A47G 23/08* | (2006.01) |
| *A47F 3/14* | (2006.01) |
| *A47G 23/06* | (2006.01) |
| *B42F 7/10* | (2006.01) |

(52) U.S. Cl.
CPC .............. *A47G 23/08* (2013.01); *A47F 3/14* (2013.01); *A47G 23/06* (2013.01); *B42F 7/10* (2013.01)

(58) Field of Classification Search
CPC .... A47G 23/08; A47G 23/06; A47G 23/0633; A47F 3/14; A47F 5/0025; A47F 10/06; B42F 7/10; A47K 3/004
See application file for complete search history.

(56) References Cited

U.S. PATENT DOCUMENTS

| | | | |
|---|---|---|---|
| 9,521,919 B1* | 12/2016 | Reyes ................. | A47G 29/093 |
| 12,102,064 B1* | 10/2024 | Yang ................... | A01K 5/0114 |
| 2011/0290697 A1* | 12/2011 | Dalhamer .............. | A47G 23/06 206/557 |
| 2012/0106158 A1* | 5/2012 | Vaessen ................ | A47G 23/06 362/253 |
| 2015/0305535 A1* | 10/2015 | de Vries ................ | A47G 23/06 206/557 |
| 2017/0054120 A1* | 2/2017 | Templeman ........ | H01M 50/242 |
| 2021/0139065 A1* | 5/2021 | Ha ........................ | B62B 5/0026 |
| 2022/0296018 A1* | 9/2022 | Nguegang .............. | A47F 10/06 |
| 2023/0182650 A1* | 6/2023 | Huang ................... | F16F 9/0236 |
| 2024/0384831 A1* | 11/2024 | Gu ......................... | A47G 23/02 |
| 2025/0010487 A1* | 1/2025 | Lee ........................ | A47F 10/06 |

* cited by examiner

*Primary Examiner* — Devin K Barnett
(74) *Attorney, Agent, or Firm* — WPAT, PC

(57) ABSTRACT

A tray module includes a bottom plate, a ring-shaped member, a limiting member, an elastic member and a tray. The ring-shaped member is disposed over the bottom plate and includes a plurality of rolling portions facing the bottom plate. The limiting member is disposed at a periphery of the ring-shaped member and over the ring-shaped member, so that the ring-shaped member is only able to move within a region defined by the limiting member. The elastic member is directly or indirectly connected between an inner ring surface of the ring-shaped member and an upper surface of the bottom plate. The tray is disposed over the limiting member and configured to connect the ring-shaped member.

10 Claims, 6 Drawing Sheets

TRAY MODULE

FIELD OF THE INVENTION

The present invention relates to a tray module, in particular to a shock-absorbing tray module.

BACKGROUND OF THE INVENTION

When a tray transports a container containing a material (e.g., food, beverages, soups or liquid materials), it is easy for the material (especially liquid materials) to leave the container due to vibration generated during transportation, especially vibration caused by a sudden impact, thus causing a lot of inconvenience. Therefore, a novel shock-absorbing tray is currently needed to solve the above problems.

SUMMARY OF THE INVENTION

The present invention provides a tray module, which includes a bottom plate, a ring-shaped member, a limiting member, an elastic member and a tray. The ring-shaped member is disposed over the bottom plate and includes a plurality of rolling portions facing the bottom plate. The limiting member is disposed at a periphery of the ring-shaped member and over the ring-shaped member, so that the ring-shaped member is only able to move within a region defined by the limiting member. The elastic member is directly or indirectly connected between an inner ring surface of the ring-shaped member and an upper surface of the bottom plate. The tray is disposed over the limiting member and configured to connect the ring-shaped member.

In some embodiments of the present invention, the rolling portions are a plurality of universal rolling components.

In some embodiments of the present invention, the bottom plate has a first connecting portion extending upward from a central region of the upper surface of the bottom plate, and one end of the elastic member is connected to the upper surface of the bottom plate through the first connecting portion.

In some embodiments of the present invention, the ring-shaped member further includes a second connecting portion extending radially from the inner ring surface of the ring-shaped member, and another end of the elastic member is connected to the inner ring surface of the ring-shaped member through the second connecting portion.

In some embodiments of the present invention, a length of the second connecting portion is adjustable.

In some embodiments of the present invention, the limiting member includes: a plurality of limiting posts, distributed over a region of the periphery of the bottom plate other than a region where the ring-shaped member is located; and a limiting plate, connected to the limiting posts and across the upper surface of the ring-shaped member.

In some embodiments of the present invention, the limiting plate has a geometric pattern.

In some embodiments of the present invention, the tray is configured to detachably connect the ring-shaped member.

In some embodiments of the present invention, the ring-shaped member further includes at least one engaging portion extending upward, and the tray has at least one through hole configured to receive the engaging portion.

In some embodiments of the present invention, a peripheral edge of the tray is sloped downward.

BRIEF DESCRIPTION OF THE DRAWINGS

Aspects of the present invention are best understood from the following embodiments, read in conjunction with accompanying drawings. However, it should be understood that in accordance with common practice in the industry, various features have not necessarily been drawn to scale. Indeed, shapes of the various features may be suitably adjusted for clarity, and dimensions of the various features may be arbitrarily increased or decreased.

DETAILED DESCRIPTION OF THE PREFERRED EMBODIMENT

Figure 1:
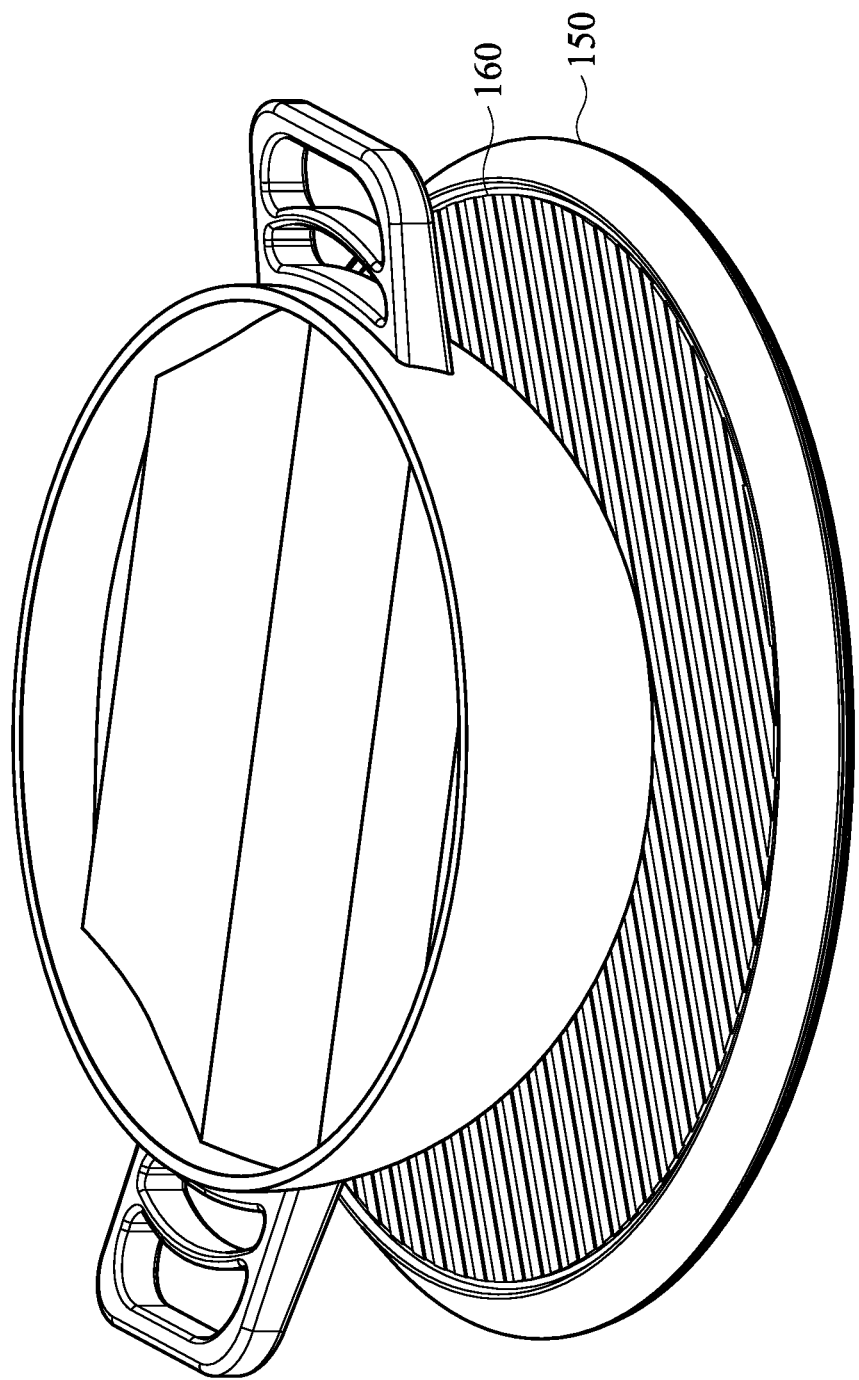
FIG. 1 is a schematic diagram of an appearance of a tray module according to an embodiment of the present invention.

The advantages and features of the present invention and the method for achieving the same will be described in more detail with reference to exemplary embodiments and accompanying drawings to make it easier to understand. However, the present invention can be implemented in different forms and should not be construed as being limited to the embodiments set forth herein. On the contrary, for those skilled in the art, the provided embodiments will make this disclosure more thorough, comprehensive and complete to convey the scope of the present invention.

The spatially relative terms in the text, such as "beneath" and "over", are used to facilitate the description of the relative relationship between one element or feature and another element or feature in the drawings. The true meaning of the spatially relative terms includes other orientations. For example, when the drawing is flipped up and down by 180°, the relationship between the one element and the other element may change from "beneath" to "over." The spatially relative descriptions used herein should be interpreted the same.

As mentioned in the prior art, when a tray transports a container containing a material (e.g., food, beverages, soups or liquid materials), it is easy for the materials (especially liquid materials) to leave the container due to vibration generated during transportation, especially vibration caused by a sudden impact, thus causing a lot of inconvenience. Accordingly, the present invention provides a tray module, which includes a bottom plate, a ring-shaped member, a limiting member, an elastic member and a tray, in which the elastic member is connected between the ring-shaped member and the bottom plate, and the tray is configured to connect the ring-shaped member. Based on the configuration of the above components, when the tray is moved due to vibration caused by a sudden impact, the ring-shaped member is moved and the elastic member is stretched. Next, a rebound force of the elastic member causes the ring-shaped member to rebound and drive the tray back to its original position. Therefore, the tray module of the present invention has excellent cushioning and shock-absorbing effects, and can be applied to various equipment (e.g., trolleys, tracks or robots) used to transport materials, such as food delivery or transportation of liquid samples. In addition, the tray module of the present invention can also have functions such as being able to adjust a stretchable distance of the elastic member, being quick to disassemble for cleaning, and preventing liquid from remaining. Various embodiments of the tray module of the present invention will be described in detail below.

Figure 2:
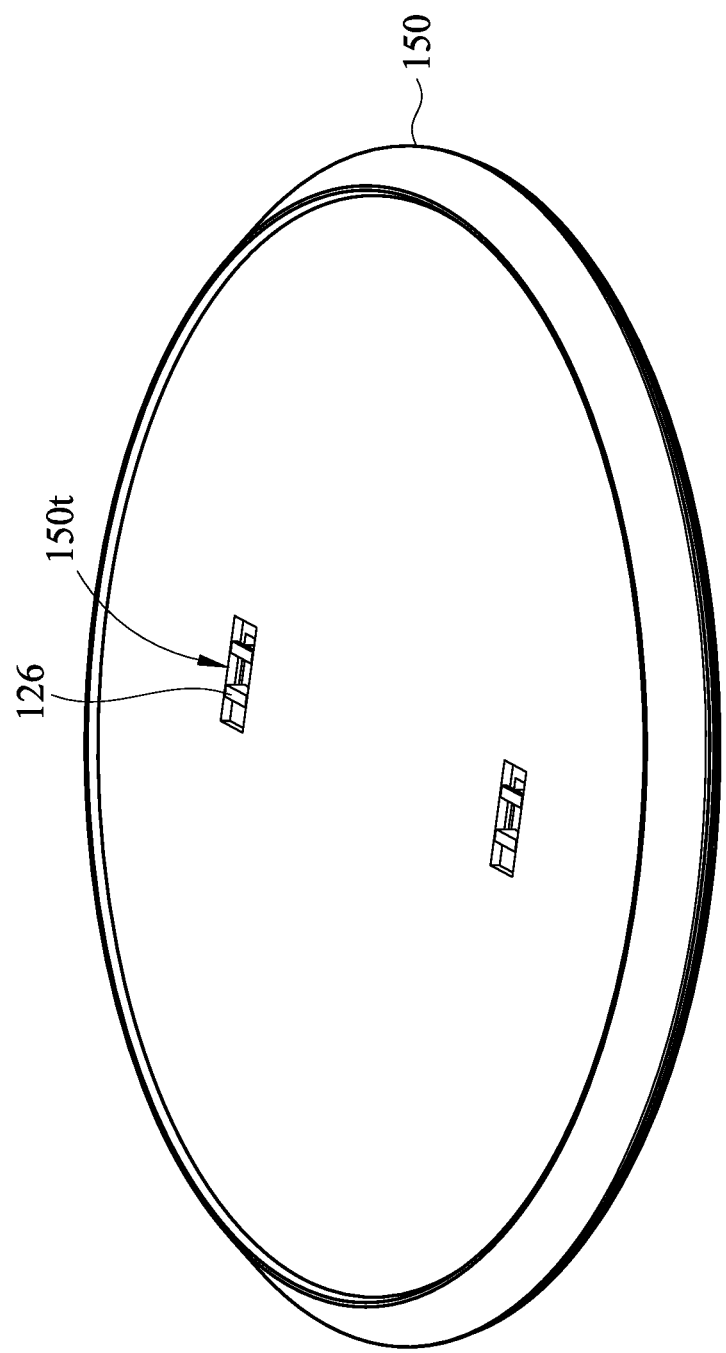
FIG. 2 is a schematic diagram of an appearance of a tray module (excluding an anti-slip pad) according to an embodiment of the present invention.
Figure 3:
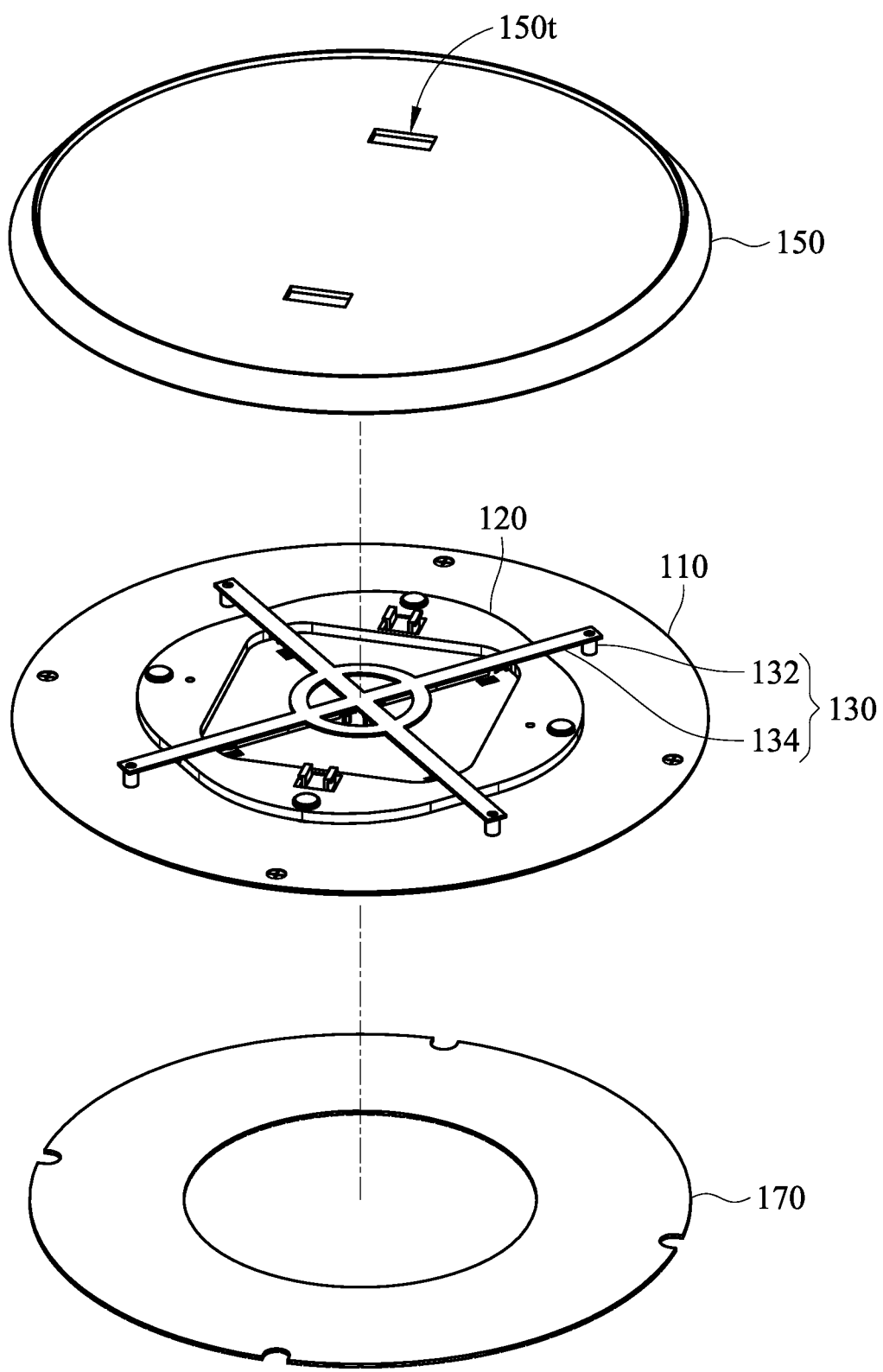
FIG. 3 is an exploded schematic diagram of the tray module of FIG. 2.
Figure 4:
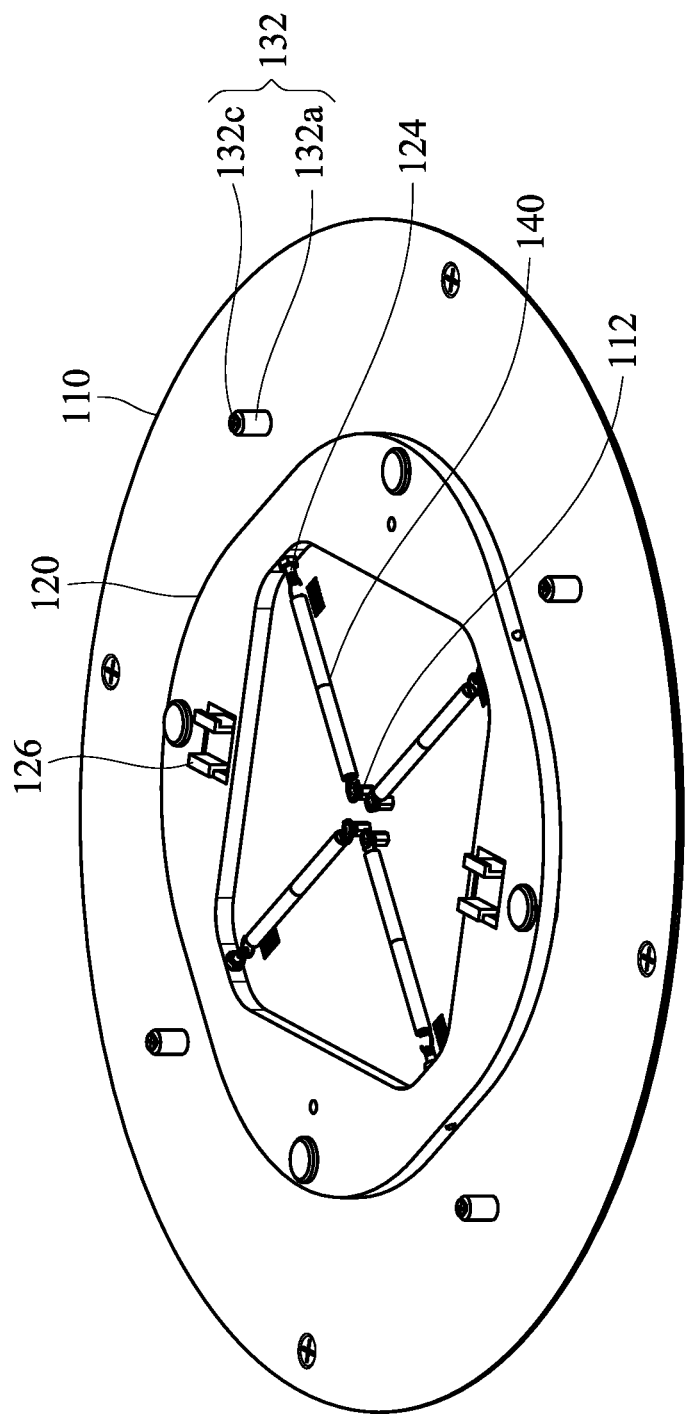
FIG. 4 is a top perspective view of a bottom plate, a ring-shaped member, limiting posts and elastic members of FIG. 3.
Figure 5:
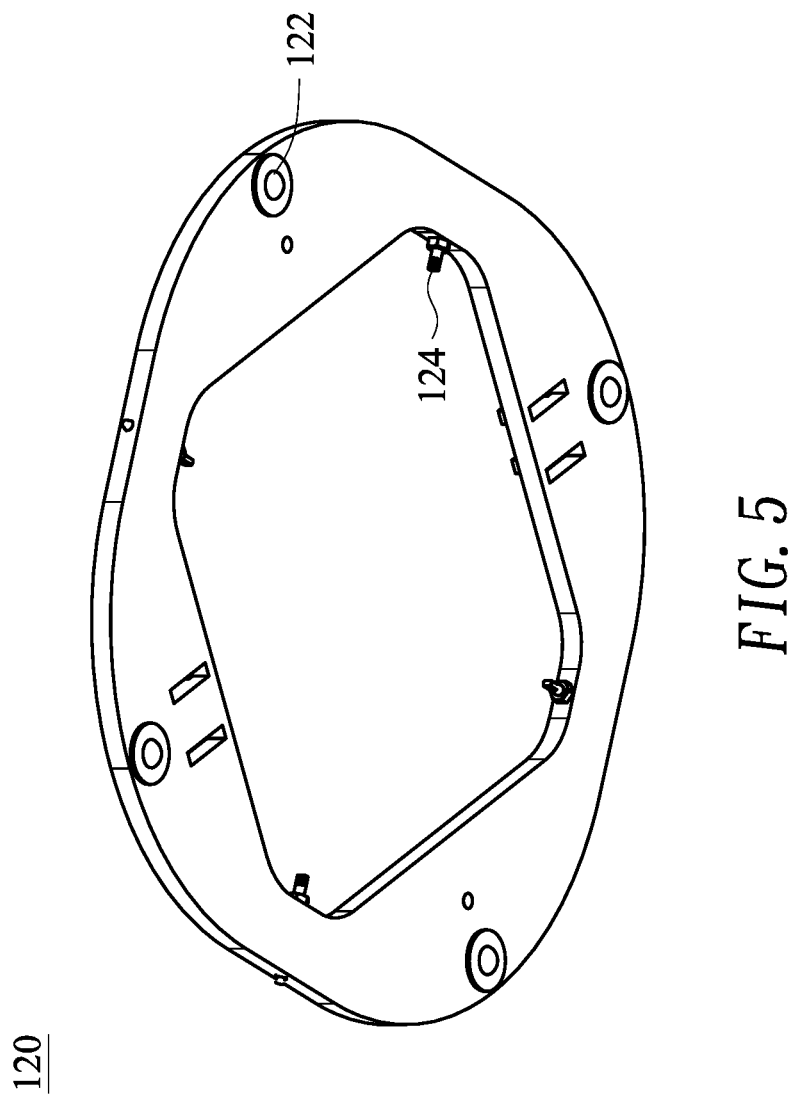
FIG. 5 is a bottom perspective view of the ring-shaped member of FIG. 4.
Figure 6:
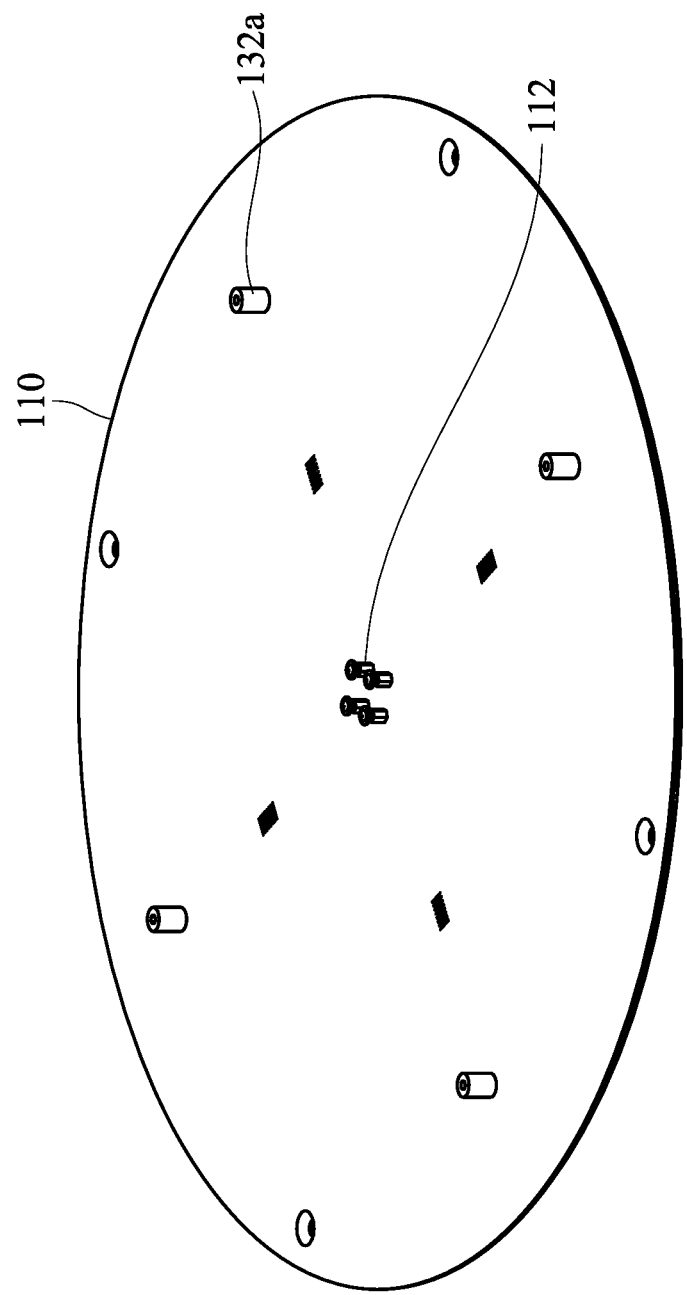
FIG. 6 is a top perspective view of the bottom plate of FIG. 4.

FIG. 1 is a schematic diagram of an appearance of a tray module according to an embodiment of the present invention. FIG. 2 is a schematic diagram of an appearance of a tray module (excluding an anti-slip pad) according to an embodiment of the present invention. FIG. 3 is an exploded schematic diagram of the tray module of FIG. 2. FIG. 4 is a top perspective view of a bottom plate, a ring-shaped member, limiting posts and elastic members of FIG. 3. FIG. 5 is a bottom perspective view of the ring-shaped member of FIG. 4. FIG. 6 is a top perspective view of the bottom plate of FIG. 4. As shown in FIGS. 1 to 6, the tray module includes a bottom plate 110, a ring-shaped member 120, a limiting member 130, an elastic member 140 and a tray 150.

In some embodiments, as shown in FIG. 1, the tray module further includes an anti-slip pad 160, which is disposed over the tray 150 to prevent the container (not labeled) from sliding during the movement of the tray module. In some embodiments, as shown in FIG. 3, the tray module further includes a shock-isolating pad 170 disposed beneath the bottom plate 110 to reduce the impact of vibration on the structure on the shock-isolating pad 170.

In some embodiments, as shown in FIGS. 3, 4 and 6, the bottom plate 110 is a flat plate. In other embodiments, the bottom plate may be disk-shaped or other suitable shapes. In some embodiments, as shown in FIGS. 4 and 6, the bottom plate 110 has a first connecting portion 112 extending upward from a central region of the upper surface of the bottom plate 110, and one end of the elastic member 140 is connected to the upper surface of the bottom plate 110 through the first connecting portion 112. In some embodiments, a hook portion of the elastic member 140 hooks the first connecting portion 112. In some embodiments, as shown in FIG. 6, the first connecting portion 112 is a part of a fastener (e.g., a bolt) or another suitable component. In some embodiments, referring to FIG. 6, the bottom plate 110 has a recess (not shown) inwardly recessed from a central region of the bottom plate 110, and a bolt can be inserted into the recess, and a portion of the bolt is exposed, and the exposed portion of the bolt is the first connecting portion 112.

As shown in FIGS. 3 to 5, the ring-shaped member 120 is disposed over the bottom plate 110 and includes a plurality of (e.g., three or more) rolling portions 122 facing the bottom plate 110. The rolling portion 122 may be, for example, any rolling component, such as a universal rolling component, a roller, etc. In some embodiments, the rolling portions 122 are a plurality of universal rolling components, so that the ring-shaped member 120 can move universally on the bottom plate 110.

In some embodiments, as shown in FIGS. 4 and 5, the ring-shaped member 120 further includes a second connecting portion 124 extending radially from an inner ring surface of the ring-shaped member 120, and another end of the elastic member 140 is connected to the inner ring surface of the ring-shaped member 120 through the second connecting portion 124. In some embodiments, another hook portion of the elastic member 140 is through a hole of the second connecting portion 124. In some embodiments, the second connecting portion 124 is a part of a fastener (e.g., a screw rod) or another suitable component. In some embodiments, the ring-shaped member 120 has a recessed portion (not shown) that is recessed radially inward. The screw rod can be inserted into the recessed portion, and a portion of the screw rod is exposed. The exposed portion of the screw rod is the second connecting portion 124.

In some embodiments, referring to FIGS. 4 and 5, a length of the second connecting portion 124 is adjustable. As such, the user can adjust an initial stretch length of the elastic member 140 to adjust an initial tension and a stretchable distance. In some embodiments, as shown in FIGS. 4 and 6, a scale pattern (not labeled) is provided on the bottom plate 110 to facilitate the user to adjust a top end of the second connecting portion 124 to a specific position.

As shown in FIGS. 3 and 4, the limiting member 130 is disposed on the periphery of the ring-shaped member 120 and over the ring-shaped member 120, so that the ring-shaped member 120 can only move within a region limited by the limiting member 130 (e.g., a set shock-absorbing specification). The shock-absorbing specification is, for example, an effective expansion and contraction length of the elastic member 140, so that the elastic member 140 can operate normally within its due life, and avoid shortening the life of the elastic member 140 due to improper expansion and contraction. In some embodiments, the limiting member 130 is disposed over a region of the periphery of the bottom plate 110 other than a region where the ring-shaped member 120 is located, and across an upper surface of the ring-shaped member 120.

In some embodiments, as shown in FIGS. 3 and 4, the limiting member 130 includes a plurality of limiting posts 132 and a limiting plate 134. The limiting posts 132 are distributed over the region of the periphery of the bottom plate other than the region where the ring-shaped member is located, and the limiting plate 134 is connected to the limiting posts 132 and across the upper surface of the ring-shaped member 120.

In some embodiments, as shown in FIG. 4, the limiting posts 132 surround and define a region, and the ring-shaped member 120 can only move horizontally within this region. When the ring-shaped member 120 moves and touches the limiting post 132, it will be blocked by the limiting post 132 and stop. In some embodiments, as shown in FIGS. 3, 4 and 6, the limiting post 132 includes an accommodating portion 132*a* and a cylinder 132*c*. The accommodating portion 132*a* protrudes from the upper surface of the bottom plate 110, and the cylinder 132*c* is through an opening of the limiting plate 134 and inserted into the accommodating portion 132*a*, so as to fix the limiting plate 134 on the accommodating portion 132*a*. In some embodiments, as shown in FIG. 4, the cylinder 132*c* is a screw, and the accommodating portion 132*a* is a screw hole. In some embodiments, as shown in FIGS. 4 and 6, the accommodating portion 132*a* and the bottom plate 110 are integrally formed.

In some embodiments, the limiting plate 134 has a geometric pattern, such as a straight pattern, a cross pattern, a mesh pattern, a polygonal pattern (e.g., a triangular pattern, a rectangular pattern), a circular pattern, or other suitable patterns. In some embodiments, as shown in FIG. 3, the limiting plate 134 have a cross pattern. In some embodiments, the limiting plate 134 is composed of a cross pattern and a circular pattern.

However, the present invention is not limited to the foregoing embodiments. In practical applications, the limiting member 130 may have another shape or be composed of other components, as long as it can enable the ring-shaped member 120 to move horizontally only within a limited region.

As shown in FIGS. 3 and 4, the elastic member 140 is directly or indirectly connected between the inner ring surface of the ring-shaped member 120 and the upper surface of the bottom plate 110. In some embodiments, both ends of the elastic member 140 are connected to the inner ring surface of the ring-shaped member 120 and the upper surface of the bottom plate 110 through the second connecting portion 124 and the first connecting portion 112, respectively. In some embodiments, as shown in FIG. 3, the tray module includes a plurality of elastic members 140, a number of which may be three, four, five or more than six, so as to provide good cushioning and shock-absorbing effects in all directions. In some embodiments, the elastic member 140 is a tension spring or another suitable component.

In some embodiments, as shown in FIG. 3, a vertical projection of the limiting plate 134 is overlapped with or even substantially aligned with a vertical projection of the elastic member 140. However, the present invention is not limited thereto, and the vertical projection of the limiting plate 134 can be separated from the vertical projection of the elastic member 140.

As shown in FIGS. 1 to 3, the tray 150 is used to carry a container containing a material, and is disposed over the limiting member 130, and is configured to connect the ring-shaped member 120. When the tray 150 is displaced, the ring-shaped member 120 is displaced accordingly; when the ring-shaped member 120 returns to its original position, the tray 150 returns to its original position. When the tray 150 is moved due to a sudden impact or vibration, the ring-shaped member 120 is also moved and stretches one or more of the elastic members 140, and the ring-shaped member 120 then rebounds due to the elastic force of the stretched elastic member(s) and drives the tray 150 to return to its original position.

In some embodiments, as shown in FIGS. 2 and 3, the tray 150 is configured to detachably connect the ring-shaped member 120 to facilitate the user to disassemble the tray 150 to clean the components beneath the tray 150 (i.e., the limiting member 130, the ring-shaped member 120 and the elastic member 140). In some embodiments, the ring-shaped member 120 further includes at least one engaging portion 126 extending upward, and the tray 150 has at least one through hole 150t configured to accommodate the engaging portion 126, so that the tray module of the present invention has a quick-release cleaning function. In some embodiments, the periphery of the tray 150 is sloped downward to prevent water and dirt from accumulating in the tray module and to facilitate wiping and cleaning.

In some embodiments, as shown in FIG. 3, a portion of the limiting member 130 (e.g., the limiting plate 134) is disposed between the ring-shaped member 120 and the tray 150 to prevent the ring-shaped member 120 from moving upward. As such, when the user directly removes the tray 150 from the ring-shaped member 120, the ring-shaped member 120 and the elastic member 140 do not move upward, which can effectively prevent the elastic member 140 from being damaged due to improper pulling.

However, the above are only the preferred embodiments of the present invention, and should not be used to limit the scope of implementation of the present invention, that is, simple equivalent changes and modifications made in accordance with claims and description of the present invention are still within the scope of the present invention. In addition, any embodiment of the present invention or claim does not need to achieve all the objectives or advantages disclosed in the present invention. In addition, the abstract and the title are not intended to limit the scope of claims of the present invention.

What is claimed is:

1. A tray module, comprising:
    a bottom plate;
    a ring-shaped member, disposed over the bottom plate and comprising a plurality of rolling portions facing the bottom plate;
    a limiting member disposed at a periphery of the ring-shaped member and over the ring-shaped member, so that the ring-shaped member is only able to move within a region limited by the limiting member;
    an elastic member, directly or indirectly connected between an inner ring surface of the ring-shaped member and an upper surface of the bottom plate; and
    a tray, disposed over the limiting member and configured to connect to the ring-shaped member.

2. The tray module of claim 1, wherein the rolling portions are a plurality of universal rolling components.

3. The tray module of claim 1, wherein the bottom plate has a first connecting portion extending upward from a central region of the upper surface of the bottom plate, and one end of the elastic member is connected to the upper surface of the bottom plate through the first connecting portion.

4. The tray module of claim 3, wherein the ring-shaped member further comprises a second connecting portion extending radially from the inner ring surface of the ring-shaped member, and another end of the elastic member is connected to the inner ring surface of the ring-shaped member through the second connecting portion.

5. The tray module of claim 4, wherein a length of the second connecting portion is adjustable.

6. The tray module of claim 1, wherein the limiting member comprises:
    a plurality of limiting posts, distributed over a region of the periphery of the bottom plate other than a region where the ring-shaped member is located; and
    a limiting plate, connected to the limiting posts and across the upper surface of the ring-shaped member.

7. The tray module of claim 6, wherein the limiting plate has a geometric pattern.

8. The tray module of claim 1, wherein the tray is configured to detachably connect the ring-shaped member.

9. The tray module of claim 1, wherein the ring-shaped member further comprises at least one engaging portion extending upward, and the tray has at least one through hole configured to receive the engaging portion.

10. The tray module of claim 1, wherein a peripheral edge of the tray is sloped downward.

* * * * *